CHARLES H. PARSHALL.
Improvement in Oil Cups.
No. 125,405.            Patented April 9, 1872.
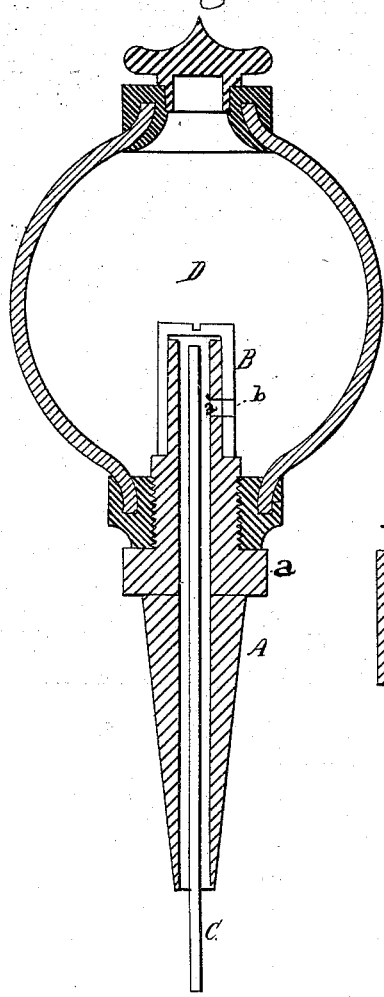
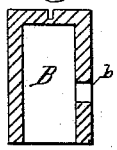
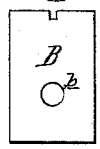
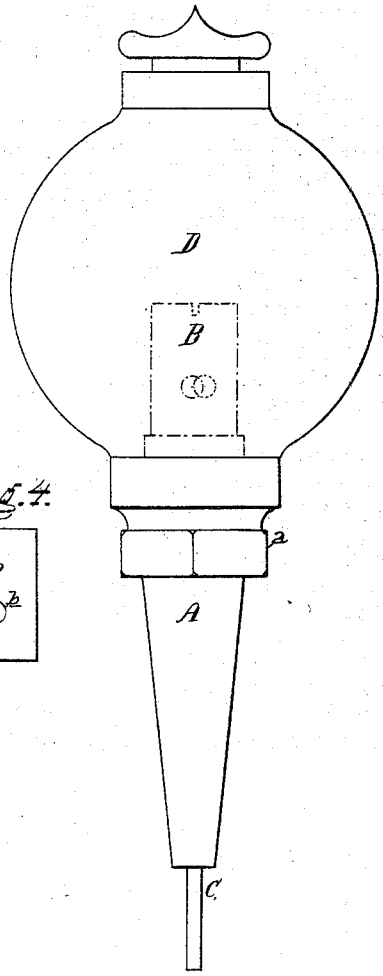
Witnesses.            Inventor.
W. C. Shaw
Timothy McCarthy
Charles H Parshall

UNITED STATES PATENT OFFICE.

CHARLES H. PARSHALL, OF DETROIT, ASSIGNOR TO DANIEL A. MATTHEWS, OF YPSILANTI, AND HENRY McGRAW, OF DETROIT, MICHIGAN.

IMPROVEMENT IN OIL-CUPS.

Specification forming part of Letters Patent No. 125,405, dated April 9, 1872.

*To whom it may concern:*

Be it known that I, CHARLES H. PARSHALL, of Detroit, in the county of Wayne and State of Michigan, have invented a new and useful Improvement in Oil-Cups; and I do declare that the following is a true and accurate description thereof, reference being had to the accompanying drawing and to the letters of reference marked thereon and being a part of this specification, in which—

Figure 1 is a perspective view of the exterior of my improved oil-cup, and Fig. 2 is a perspective sectional view of the interior thereof.

The nature of this invention relates to an improved construction of oil-cups for lubricating machinery and for regulating the flow of the oil from the cup to the journal. The invention consists in combining with the stem and cap as constructed a conducting and clearing wire, as more fully hereinafter set forth.

In the drawing, A is a tubular metallic stem, formed with a rectangular nut, *a*. Below this nut the stem is slightly coned, and is threaded to screw into the cap of a journal-box. Immediately above the nut the stem has cut on it a male thread to screw into the metallic socket, to which is secured an oil reservoir or bowl, D. Above the thread the stem is turned down plain to a lesser diameter than the threaded part, and over it is slipped a metallic cap, B, closed at the top. In the side of the plain part of the stem an aperture, $a'$, is made, communicating with the passage or bore of the stem. In the side of the cap is a corresponding aperture, *b*, which, when turned to coincide with the aperture in the stem, will allow the oil in the bowl to flow through the stem to the journal. By rotating the cap axially on the stem the opening may be partially closed to regulate the flow or to shut it off entirely. C is a wire, which is placed in the canal of the stem, extending below the mouth thereof, and resting upon the journal to be lubricated, and extending to the top of the canal. The object of this wire is to conduct the oil to the journal and to render its flow uniform, in which case the slight vibration imparted to it by the moving part or journal makes its operation absolutely certain, and is a sure preventive against the gumming of the oil in the canal.

What I claim as my invention, and desire to secure by Letters Patent, is —

In combination with the stem A and cap B, constructed as described, the wire C, as and for the purpose specified.

CHARLES H. PARSHALL.

Witnesses:
TIMOTHY McCARTHY,
WM. JOHNS, Jr.